3,128,311
PREPARATION OF PRIMARY AMINES
Robert L. Shirley and George P. Speranza, Austin, Tex., assignors to Jefferson Chemical Company, Inc., Houston, Tex., a corporation of Delaware
No Drawing. Filed Dec. 11, 1961, Ser. No. 158,596
8 Claims. (Cl. 260—585)

This invention relates to an improved process of aminating alcohols.

According to the invention there is provided a process for the production of primary amines which is performed by allowing an aliphatic alcohol to react with ammonia in the presence of a specific catalyst system. The catalyst contains a combination of three metallic components (nickel, copper and an oxide of chromium titanium, thorium, zinc or manganese). The nickel and copper may be in the form of the free metals or as the oxides. Since the reactions are preferably carried out in a reducing medium, the active state of the nickel and copper is usually in the metallic form. The third component is an oxide that is not reduced under the conditions of the reaction. The catalysts may contain inert supports, such as silica, diatomaceous earth, etc.

There are decided advantages in the use of these catalysts in this reaction. Higher conversions are obtained in the multi-metallic catalyst system and this system gives higher yields of the primary amines with subsequently less production of second and tertiary amines. Because of the high conversions, high yields of primary amines and the greater stability of the catalysts, more primary amines can be obtained per unit of catalyst than when the conventional nickel, cobalt or copper catalysts are used.

Several methods describing the amination of alcohols are recorded in the literature, but only a few claim high yields of primary amines. Large amounts of secondary and tertiary amines are obtained when the reactions are allowed to proceed to high conversions. Fair to good yields have been reported in isolated examples when the conversions were maintained at a low level. This is a decided disadvantage where it is desirable to separate the amines from the alcohols by distillation. Many commercial alcohols are sold as mixtures. We refer to the oxo alcohols (such as tridecyl, isooctyl, etc.), fatty alcohols such as natural or synthetic commercial $C_{10}$ to $C_{18}$ straight chain alkyl alcohols. When the amination reaction is carried out using such alcohols, it is desirable to obtain very high conversions because separation of alcohols from the corresponding primary amines by distillation is difficult.

In one preferred method of carrying out the invention, the alcohol (e.g. an alkanol containing 1 to 20 carbon atoms) and catalyst are added to a high pressure autoclave and the contents flushed with hydrogen. Liquid ammonia is pressured in by means of hydrogen and hydrogen added as desired. Usually hydrogen is added at room temperature to a pressure of about 500 p.s.i.g. and then the contents are heated to reaction temperature. The preferred reaction temperature is in the range of 180° to 275° C. and, when hydrogen is used, the preferred pressure is within the range of 1000 to 5000 p.s.i.g. and hydrogen constitutes from about 30% to 80% of the total pressure. The ammonia to alcohol ratio should be at least one with the prefererd ratios being from 2 to 8. The reaction is rapid and reaction times of from 1 to 3 hours usually give the desired conversions of 60% to 95%. The yields of primary amine versus secondary amine depend to some extent on the degree of conversion. Moderate conversion of alcohols usually afford the best yields of primary amine and suppress secondary amine formation. After the reaction is allowed to proceed for the desired length of time the autoclave is cooled, the excess hydrogen and ammonia vented and the products worked up by conventional methods.

The reaction may be conducted batchwise or in a continuous operation.

The catalyst of the present invention contains, as the active components, about 50 to 90 wt. percent of nickel, about 10 to 50 wt. percent of copper and about 0.5 to 5 wt. percent of an oxide selected from the class consisting of chromium oxide, titanium oxide, thorium oxide, magnesium oxide, zinc oxide and manganese oxide. A preferred group of catalysts contain about 70 to 77 wt. percent nickel, about 20 to 25 wt. percent copper and about 3 to 5 wt. percent of chromium oxide (calculated as the metal).

As mentioned above, a specific advantage of the catalyst of this invention is the high yields of primary amine at high conversions. By way of comparison Table I illustrates the yields of primary and secondary amines obtained using catalysts as described in prior art. This data can be found in Houben-Weyl, vol. 11/1, 1957, p. 131 and 132.

It is apparent from Table I that when the conversions exceed about 70% the yield of secondary amine often exceed that of the primary amine by a factor of as much as 3 to 1. However, in some cases where secondary alcohols are used, the yields of primary amines are good to excellent when the conversions are maintained at a relatively low level.

TABLE I

*Aminolysis of Alcohols Over Hydrogenation Catalysts*

| Alcohol | Catalyst | Temp., °C. | Conversion | Yield, percent amine | |
|---|---|---|---|---|---|
| | | | | Primary | Secondary |
| Ethanol | Reduced Nickel | 159 | ca. 80 | 27.4 | 45.0 |
| Butanol | Nickel | 181 | ca. 86 | 24.4 | 48.7 |
| Propanol | Raney Copper/BaOH | 240 | 96 | 23 | 66.2 |
| Do | Raney Nickel/BaOH | 195 | 95 | 26 | 53 |
| Butanol | Raney Copper/BaOH | 250 | 96 | 21 | 64.2 |
| 3,5,5-Trimethylhexanol | Raney Nickel/BaOH | 200 | 90 | ca. 20 | ca. 50 |
| Tetrahydrofurfuryl alcohol | do | 210 | 73 | ca. 53 | ca. 6 |

The invention is illustrated by the examples below:

EXAMPLE 1

To a one-gallon stirred autoclave was added 666 grams (9 mols) of n-butanol and 200 grams of nickel-copper-chromia catalyst containing 78.1 wt. percent nickel, 14.2 wt. percent copper and chromium oxide calculated as 1.06 wt. percent chromium. The autoclave was assembled, the contents flushed twice with hydrogen and 459 grams of liquid ammonia (9 mols) was added. Hydrogen was added and the contents heated to 207° C. over a period of about 45 minutes. The reaction was maintained at 207° to 213° C. for two hours while maintaining a pressure of 2200 to 2350 p.s.i.g. The products were pressured out through a dip tube into a flask connected to a Dry-Ice trap designed to collect excess ammonia and material entrained in the ammonia. The product was filtered to remove catalyst and a Dry-Ice trap was used in the vacuum system to collect again unreacted ammonia and any entrained material. The combined ammonia fractions were warmed to 50° C. under an ice-water condenser, allowing ammonia to escape and leaving behind most of the entrained material. The liquid products were distilled to give the following results:

100 grams of unreacted alcohol (85% conversion), 340 grams of n-butylamine (61% yield), and 140 grams of di-n-butylamine (28.5% yield).

Another example with n-butanol utilizing the procedure described in this example is summarized in Table II which follows:

EXAMPLE 2.—ISOBUTANOL

To a one-gallon stirred autoclave was added 666 grams of isobutanol and 200 grams of pelleted nickel-copper-chromia catalyst of Example 1. The contents were flushed twice with hydrogen and 459 grams of ammonia added. Hydrogen was added until the gauge showed a total pressure of 400 p.s.i.g. The reaction was maintained at 217° to 226° C. for 2 hours while maintaining a pressure of 2300 to 2800 p.s.i.g. The product was filtered and distilled to give the following results.

Isobutanol recovered _____ 180 g., 73% conversion.
Isobutylamine isolated _____ 346 g., 72% yield.
Di-isobutylamine isolated _____ 25 g., 6.0%.

EXAMPLE 3

To a one-gallon stirred autoclave was added 1200 grams (6 mols) of tridecyl alcohol (commercial oxo alcohol) and 400 grams of nickel-copper-chromia pellets as in Example 2. The autoclave was assembled, flushed twice with hydrogen and 428 grams (25 mols) of ammonia added. Hydrogen was added to give a total pressure of 400 p.s.i. at room temperature. The reactants were heated to 215° C. and hydrogen was added to give a total pressure of 2500 p.s.i.g. The reaction was run at 215 to 222° C. and 2500 p.s.i.g. for 3 hours. The reaction mixture was filtered and then distilled at 40 mm. pressure. The tridecylamine (B.P. 135–155° C./40 mm.) obtained had a neutral equivalent of 195. After separating five fractions the following accounting was made: Yields: 59.1% tridecylamine based on alcohol charged, 11% di(tridecylamine), 7% recovered alcohols, 10% unidentified forerun and residues, ~12% handling losses. The yelds based on 93% conversion were 63% tridecylamine and 13% di-tridecylamine.

EXAMPLES 4 AND 5

Tridecyl alcohol and ammonia (4 mols of ammonia per mol of alcohol) and hydrogen (400 p.s.i.g. at room temperature) and the nickel-copper-chromia catalyst as in Example 2 were heated to 210° C. and held at that temperature for two hours. The reaction vessel was a stainless-steel autoclave. At reaction temperature, the pressure fell from 2100 to 1700 p.s.i.g. The autoclave was cooled, vented and the products isolated by distillation. Analysis of the fractions showed that 77% of the starting alcohol was converted. A yield of 80% tridecyl amine was obtained. In a similar reaction using Raney nickel, only a 47% conversion of alcohol was obtained.

EXAMPLE 6

To a one-gallon stirred autoclave was added 520 grams of 2-ethylhexanol, 544 grams of ammonia, 130 grams of the nickel-copper-chromia catalyst in the manner used in the previous examples. Hydrogen was added to a total pressure of 300 p.s.i.g. and the reactants heated to 219° C. The reaction conditions which were maintained were 219° to 220° C., 2500 to 2700 p.s.i.g. and a four-hour holding time. The products were filtered, the water layer was separated, and the organic layer was dried by azeotroping out the remaining water with benzene. Distillation of the remainder showed that the alcohol was consumed to the extent of 97% and that the yield of 2-ethylhexylamine was 69% and the yield of di-2-ethylhexylamine was 11%. The foregoing and additional experiments are reported in Table II.

EXAMPLE 7

This run was made in the absence of hydrogen. To a one-liter stirred autoclave was added 400 grams of n-butanol, 40 grams of nickel-copper-chromia catalyst as in prior examples and 140 grams of liquid ammonia. The contents were heated to 200° C. and held at this temperature for three hours. A pressure of 3100 p.s.i.g. developed which decreased to 1775 p.s.i.g. The products were cooled and the gases reacted through a Dry-Ice trap. The collected material was added to the product and the combined liquids dried over solid sodium hydroxide. The organic layer was distilled and 32.8% of the alcohol charged was recovered. The yield of n-butylamine was 58.4% based on unrecovered alcohol and 20.3% di-n-butylamine.

TABLE II

*Amination of Alcohols With Nickel-Copper-Chrome Catalysts*

| Alcohol | Mols Ammonia to Alcohol | Reaction Temp., °C. | Reaction Time, Hrs. | Conversion, Percent | Yields of Amines, Percent | |
|---|---|---|---|---|---|---|
| | | | | | Primary | Secondary |
| Tridecyl | 4 | 220 | 3 | 93 | 63 | 13 |
| Do | 4 | 210 | 2 | 77 | 80 | 8 |
| Isooctyl | 8 | 220 | 0.8 | 84 | 67 | 17 |
| Do | 4 | 210 | 5 | 92 | 55 | 33 |
| Do | 4 | 210 | 3 | 86 | 58 | 22 |
| 2-Ethylhexyl | 8 | 220 | 2 | 86 | 72 | 6 |
| Do | 8 | 220 | 4 | 97 | 69 | 11 |
| n-Butyl | 4 | 210 | 1 | 57 | 69 | 13 |
| Do | 3 | 210 | 2 | 85 | 61 | 28 |
| Isobutyl | 3 | 220 | 2 | 73 | 72 | 6 |

Table II and the other examples demonstrate the results of our work. Here we were able to consistently obtain high yields of primary amine even when operating to virtual complete conversion of the alcohol. However, when excessively long reaction times were used to obtain high conversions, the yield of primary amine was reduced at the expense of secondary amine formed. Although some tertiary amines were formed they were present in almost insignificant amounts. The yields reported in Table II are based on products obtained by distillation and analysis of the various fractions by titration and, when pure alcohols were used as feed, by vapor chromatography. The total recovery of products averaged about 80 to 90% based on alcohol charged. Some losses were due to handling difficulties, entrainment of the product with ammonia, cracking or dehydrogenation of the alcohol, and the formation of an unexpected by-product, an amide—in the case of n-butanol, butyramide is formed. It is believed that this product can be formed by the following sequence of reactions.

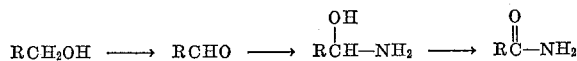

One attempt was made to use copper-chromite under reaction condition used for the 3-component catalyst. After seven hours at 220° C. the conversion of n-butyl alcohol to n-butyl amine was negligible.

EXAMPLE 8.—n-STEARYLAMINE

To a 300 ml. rocking autoclave was added 38 grams of stearyl alcohol and 20 grams of nickel-copper-chromia catalyst. The autoclave was assembled, flushed with hydrogen and 48 grams of ammonia added. Then hydrogen was added to give a total pressure of 600 p.s.i.g. at room temperature. The contents were heated to 220° C. and held at this temperature and 3300 p.s.i.g. for 1.25 hours. The product was a pure white solid which contained 67% n-stearylamine and 20% stearyl alcohol. The yield was 83%.

Having described our invention what we claim is:

1. A liquid phase process for preferentially preparing a primary amine which comprises the steps of contacting a primary alkyl alcohol and ammonia with a catalyst at a temperature within the range of about 150° to about 350° C. and a reaction pressure of at least about 200 p.s.i.g. for a period of time sufficient to convert from about 60 to about 95 wt. percent of said primary alkyl alcohol to thereby provide a reaction product comprising both a secondary amine and a primary amine corresponding to said alkyl alcohol and wherein a significant portion of said amines are said primary amine, and recovering said primary amines, said catalyst comprising an active component consisting of about 50 to about 90 wt. percent nickel, 10 to 50 wt. percent copper and 0.5 to 5 wt. percent of an oxide selected from the group consisting of chromium oxide, titanium oxide, thorium oxide, magnesium oxide, zinc oxide and manganese oxide.

2. A liquid phase process for preferentially preparing a primary amine which comprises contacting a primary alkyl alcohol with hydrogen and about 2 to about 8 mols of ammonia per mol of said alcohol in the presence of a catalyst at a temperature within the range of from about 150° to about 350° C. and a pressure within the range of about 1000 to about 5000 p.s.i.g., including a hydrogen partial pressure constituting from about 30% to about 80% of the total pressure, for a period of time sufficient to obtain conversion of about 60 to about 95 wt. percent of said primary alkyl alcohol to reaction products including a primary and a secondary amine corresponding to said alkyl alcohol, said primary amine being present in said reaction mixture in an amount greater than the amount of the secondary amine and recovering said primary amine, said catalyst comprising an active component consisting of about 50 to about 90 wt. percent of nickel, 10 to 50 wt. percent copper and 0.5 to 5 wt. percent of an oxide selected from the group consisting of chromium oxide, titanium oxide, thorium oxide, magnesium oxide, zinc oxide and manganese oxide.

3. A liquid phase process for preferentially preparing a primary amine which comprises contacting a primary alkyl alcohol containing 1 to 20 carbon atoms with about 2 to about 8 mols of ammonia per mol of said alcohol and hydrogen in the presence of a catalyst at a temperature within the range of about 180° to about 270° C. and a pressure of about 1000 to about 5000 p.s.i.g., including a hydrogen partial pressure constituting about 35% to about 85% of the total pressure, for a period of time sufficient to obtain conversion of about 60 to about 95 wt. percent of said alcohol to thereby provide a reaction product comprising a primary and a secondary amine corresponding to said alkyl alcohol, said primary amine being present in said reaction mixture in an amount greater than the amount of the said secondary amine, said catalyst comprising an active component consisting of about 70 to about 77 wt. percent of nickel, about 20 to about 25 wt. percent copper and about 3 to about 5 wt. percent of chromium oxide.

4. A method as in claim 3 wherein the alcohol is butanol and the primary amine is butylamine.

5. A method as in claim 3 wherein the alkyl alcohol is tridecyl alcohol and the primary amine is a tridecyl amine.

6. A method as in claim 3 wherein the alcohol is a 2-ethylhexol alcohol and the primary amine is a 2-ethylhexylamine.

7. A method as in claim 3 wherein the alcohol is isooctyl alcohol and wherein the primary amine is an isooctyl amine.

8. A method as in claim 3 wherein the alcohol is stearyl alcohol and wherein the primary amine is stearylamine.

References Cited in the file of this patent
UNITED STATES PATENTS 2,349,222   Goshorn et al. _____ May 16, 1944

FOREIGN PATENTS 679,014   Great Britain _____ Sept. 10, 1952
781,230   Great Britain _____ Aug. 14, 1957